Dec. 19, 1950 W. J. OSTREICHER 2,534,557

KEYSTONING CIRCUIT

Filed Jan. 19, 1949

INVENTOR.
WARREN J. OSTREICHER.
BY
Theodore Hafner
ATTORNEY.

Patented Dec. 19, 1950

2,534,557

UNITED STATES PATENT OFFICE 2,534,557

KEYSTONING CIRCUIT

Warren J. Ostreicher, New York, N. Y., assignor to Tele-Tone Radio Corporation, a corporation of New York Application January 19, 1949, Serial No. 71,569

20 Claims. (Cl. 315—27)

This invention relates to the control in size of the raster or screen elements in a television or like cathode ray tube of the scanning type; and more specifically to the keystoning of such raster or screen elements, i. e., to a predetermined variation in dimensioning of basis and height and/or their relation, of such raster or screen elements.

It is one of the objects of the invention to effect keystoning electrically or electronically and it is a specific feature of this invention to provide a keystoning circuit operative on the deflection system, and especially the deflecting circuit or circuits of a cathode ray tube of the television, radar or any other type utilizing the successive scanning of raster elements on a fluorescent screen.

Another object of the invention is to provide a keystoning circuit which may be adapted to any existing cathode ray tube receiver or apparatus with a minimum of additional elements or changes in the system.

It is a specific feature of the invention to vary a magnetic coupling arranged between horizontal and vertical deflection circuits, in such a manner as to cause variation of the scanned elements at a predetermined degree.

A more specific object of the invention is, when providing a magnetic coupling between horizontal and vertical deflection circuits, to vary the usually fixed center saturation point of this magnetic coupling in such a way as to cause the desired keystoning effect.

Still more specific an object of the invention is to keystone by a D.-C. controlled flux component causing a corresponding variation of the center saturation point in the magnetic coupling.

It is an important object of the invention to control the size and/or proportion of the screen elements of a cathode ray tube, in a simple and inexpensive manner, from the outside of the apparatus.

More specifically, in accordance with this invention, output sides of the horizontal and vertical deflection circuits are intercoupled magnetically and the center saturation point of such output coupling is adjusted in accordance with the keystoning effect desired.

In an alternative embodiment of the invention, such center saturation point is adjusted by varying a gap in the magnetic circuit of the coupling between horizontal and vertical deflection circuits.

Still another embodiment of the invention provides a movable magnetic core for producing the desired change in saturation of the magnetic coupling.

The invention is not limited to the exclusive use of electrical or electronic keystoning but it may also be used, without exceeding the scope of the invention, in combination with other keystoning devices especially those of the optical type, using mirror, lenses or prisms for the controlled or uncontrolled deformation of screen elements. The keystoning, according to the present invention, may, for example, effectively be applied to compensate desired or undesired deformation of screen elements effected by other electrical, mechanical or optical means or interference.

These and other objects of the invention will be described in connection with the drawings in which.

Figures 1, 2:
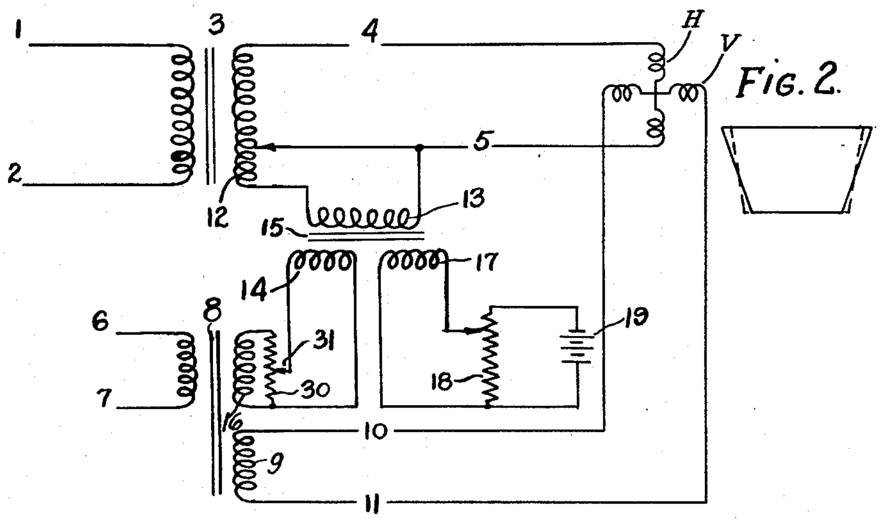
Fig. 1 shows a circuit diagram of a keystoning device embodying the invention.
Fig. 2 shows the raster element on a fluorescent screen subjected to keystoning.

In Fig. 1, 1 and 2 are lines derived from the horizontal deflection circuit of a television receiver circuit. 3 is a transformer, the output side 4. 5 of which is connected to the horizontal yoke H of a cathode ray tube (not shown).

6 and 7 are lines derived from a vertical deflection circuit which are coupled to a transformer 8, the output winding 9 of which is connected over lines 10 and 11 to the vertical yoke V of the television tube. The output sides of transformers 3 and 8, or portions thereof, are magnetically intercoupled over windings 12 of transformer 3, windings 13 and 14 coupling transformer 15 and winding 16 of transformer 8. Winding 13 is the "size" coil of the system.

The center saturation point of magnetic coupling 15 is usually fixed and is adjusted for obtaining a desired keystoning effect by the provision of a D.-C. winding 17 which is controlled by a potentiometer 18 connected to source 19.

Coupling transformer 15 is of substantially non-dissipative inductance and is shunted across a winding, as shown, or a portion of an output winding of the horizontal deflection transformer 3. This portion of the output winding may be adjustable additionally to vary the keystone control. The inductance of coupling transformer 15 may be varied so as to vary the raster without appreciably affecting the retrace time or voltage obtained from the retrace pulse.

If then, as shown in Fig. 1, a portion of the vertical saw-tooth current is used to vary the inductance of the shunting "size" coil, keystoning is obtained.

Such keystoning may be done as shown in Fig. 1 by winding the "size" coil in a common magnetic circuit with another winding carrying the vertical saw-tooth current on at least a portion thereof. In this case, a D.-C. component may be used in one of the existing coils or in a separate coil to adjust the proper point for non-linear magnetic operation thus casing the "size" coil inductance to vary with the vertical sweep.

In order to further provide some other variation in the control effect, the transformer 15 is coupled to a potentiometer 30 connected in shunt to winding 16 of vertical deflection transformer 8. The adjustable tap of potentiometer 30 is shown at 31.

Fig. 2 shows a schematically trapezoidal type raster element subjected, as shown in dotted lines, to keystoning in accordance with the invention. In the embodiment shown in Fig. 1, keystoning changes the proportion of the two bases of the trapezoidal element.

In case keystoning is applied to the vertical deflecting circuit as it may be without exceeding the scope of this invention, the relation between the two sides of the trapezium will be affected in accordance with the invention.

Figure 3:
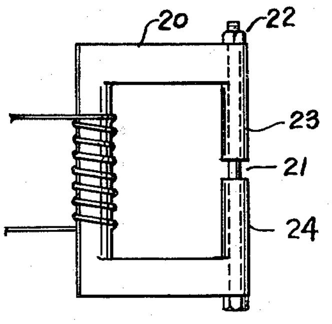
Fig. 3 shows alternative circuit means to vary the saturation of the magnetic coupling.

Fig. 3 shows schematically a magnetic core 20 for a magnetic coupling, as transformer 25, with a gap 21 which may be varied in width by adjusting the nut 22 clamping the two sides 23, 24 of the gap 21 together.

Figure 4:
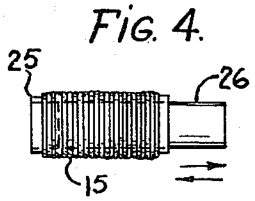
Fig. 4 shows a modification of Fig. 3.

Fig. 4 represents an alternative arrangement. Core 25 of transformer 15 is hollow and contains a slug 26 which may be moved in opposite directions to vary the point of saturation in accordance with this invention.

The magnetic coupling, described herein, may be inserted at any appropriate point in the deflection system between horizontal and vertical deflection circuits without exceeding the scope of the invention.

Any means or methods for varying the saturation of the magnetic coupling may also be used substantially without limiting the use of the invention.

Figure 5:
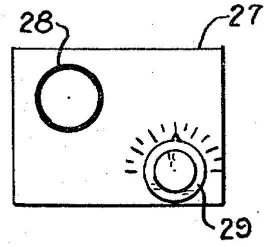
Fig. 5 shows a television receiver with extraneous keystoning control.

Fig. 5 shows a receiver cabinet 27. 28 is the screen of a television tube and knob 29 is connected or coupled to the variable tap 30 of potentiometer 18 controlling the amount of the D.-C. current which in turn adjusts the saturation point of transformer 15.

Knob 29 may, of course, be coupled to the mechanical adjustment members shown in Figs. 3 and 4, respectively, or coupled in any other manner to effect the variation in saturation required by the invention and without exceeding the scope thereof.

In the embodiments shown, the invention is applied to the keystoning of the horizontal deflection circuit. However, keystoning, in accordance with the invention, and without exceeding the scope thereof, may be applied to the vertical deflection circuit as is obvious to anyone skilled in the art.

What is claimed is:

1. In a deflection system for cathode ray tubes, horizontal and vertical deflection means, and a magnetic coupling arranged therebetween and adjustable in its saturation for effecting keystoning.

2. In a deflection system for cathode ray tubes, a pair of deflection means and a magnetic coupling arranged between said deflection means having an adjustable center point of saturation for effecting keystoning.

3. In a deflection system for a cathode ray television receiver, horizontal and vertical deflection circuits and a magnetic coupling connecting the output sides of said circuits and having an adjustable point of saturation for effecting keystoning.

4. In a deflection system for cathode ray tubes, a horizontal and a vertical deflection circuit, and a transformer in each of said circuits having output sides magnetically coupled to each other; the magnetic coupling having an adjustable point of saturation for effecting keystoning.

5. In a deflection system for a television receiver, horizontal and vertical deflection circuits and a magnetic coupling connecting the output sides of said circuits; said magnetic coupling having an adjustable point of saturation, said point of saturation being adjustable from the outside of the receiver so as to effect keystoning to a controllable extent.

6. In a deflection system for cathode ray tubes, horizontal and vertical deflection circuits, and horizontal and vertical yokes inductively coupled to said deflection circuits, respectively, the output sides of the inductive couplings being magnetically intercoupled; the magnetic intercoupling having an adjustable point of saturation for effecting keystoning.

7. System according to claim 6 wherein each inductance includes a transformer and where at least a portion of the output side of the horizontal deflection transformer is magnetically intercoupled to at least a portion of the output side of the vertical deflection transformer.

8. System according to claim 6 wherein the magnetic intercoupling includes a transformer having one winding connected to the horizontal deflection circuit and another winding connected to the vertical deflection circuit; a D.-C. carrying winding being provided and controlled to a predetermined current intensity.

9. System according to claim 6 wherein the magnetic intercoupling includes a transformer having one winding connected to the horizontal deflection circuit and another winding connected to the vertical deflection circuit and an additional winding D.-C. controlled to a predetermined current intensity.

10. System according to claim 6 wherein each of the inductances and the magnetic intercoupling includes a transformer and the latter includes a D.-C. carrying winding controlled to a predetermined intensity.

11. System according to claim 6 wherein the magnetic intercoupling includes a core having a gap of adjustable width.

12. System according to claim 6 wherein the magnetic intercoupling includes a core adjustable in position to vary the point of saturation.

13. In a deflection system for cathode ray tubes, horizontal and vertical deflection circuits, and horizontal and deflecting yokes, said circuits each including a transformer, the output sides of each transformer having a winding coupled to said horizontal and vertical yokes, respectively, at least part of the output side of each deflection transformer being magnetically intercoupled, the magnetic intercoupling having an adjustable point of saturation for effecting keystoning.

14. In a deflection system for cathode ray tubes, horizontal and vertical deflection circuits, horizontal and vertical deflection yokes, and a pair of transformers coupling, respectively, each of said deflection transformers having at least one output winding magnetically intercoupled; the magnetic intercoupling including another transformer having an adjustable point of saturation.

15. In a deflection system for cathode ray tubes, horizontal and vertical deflection circuits, horizontal and vertical deflection yokes, a pair of transformers coupling, respectively, each of the deflection circuits to the corresponding deflection yokes; the horizontal deflection transformers having an output winding, a portion of which is connected to the horizontal yoke and the vertical deflection transformer having an output winding connected to the vertical yoke; and a third transformer of an adjustable saturation having a first winding connected to another portion of said output winding of the horizontal deflection transformer, and a second winding connected to a second output winding of the vertical deflection transformer.

16. In a deflection system for cathode ray tubes, horizontal and vertical deflection circuits, horizontal and vertical deflection yokes, and a pair of transformers coupling, respectively, each of the deflection circuits to the corresponding deflection yokes; the horizontal deflection transformers having an output winding a portion of which is connected to the horizontal yoke and the vertical deflection transformer having an output winding connected to the vertical yoke; and a third transformer of adjustable saturation having a first winding connected to another portion of said output winding of the horizontal deflection transformer, and a second winding connected to a second output winding of the vertical deflection transformer; the latter connection including a potentiometer in shunt to said second output winding and having a variable tap connected to said second winding of said third transformer.

17. In a deflection system for cathode ray tubes, horizontal and vertical deflection circuits, horizontal and vertical deflection yokes, transformer means coupling each of the deflection circuits to the corresponding deflection yokes, the horizontal deflection transformer having an output winding a portion of which is connected to the horizontal yoke and the vertical deflection transformer having an output winding connected to the vertical yoke; and another transformer of adjustable saturation having a first winding connected to another portion of said output winding of the horizontal deflection transformer and a second winding connected to a second output winding of the vertical deflection transformer; said third transformer having a winding carrying direct current of controllable intensity.

18. In a deflection system for cathode ray tubes, horizontal and vertical deflection circuits, horizontal and vertical deflection yokes, transformer means coupling each of the deflection circuits to the corresponding deflection yokes, the horizontal deflection transformer having an output winding, an adjustable portion of which is connected to the horizontal yoke and the vertical deflection transformer having an adjustable output winding connected to the vertical yoke; and another transformer having a first winding connected to another portion of said output winding of the horizontal deflection transformer and a second winding connected to a second output winding of the vertical deflection transformer; said other transformer having a separate winding carrying direct current of variable intensity.

19. In a deflection system for cathode ray tubes, horizontal and vertical deflection circuits, horizontal and vertical deflection yokes, a pair of transformers coupling, respectively, each of the deflection circuits to the corresponding deflection yokes, the horizontal deflection transformer having an adjustable output winding a portion of which is connected to the horizontal yoke and the vertical deflection transformer having an output winding connected to the vertical yoke; and a third transformer having a first winding connected to another portion of said output winding of the horizontal deflection transformer and a second winding connected to a second output winding of the vertical deflection transformer; said third transformer comprising a magnetic core having a gap adjustable in width.

20. In a deflection system for cathode ray tubes, horizontal and vertical deflection circuits, horizontal and vertical deflection yokes, a pair of transformers coupling, respectively, each of the deflection circuits to the corresponding deflection yokes; the horizontal deflection transformer having an output winding a portion of which is connected to the horizontal yoke and the vertical deflection transformer having an output winding connected to the vertical yoke; a third transformer having a first winding connected to another portion of said output winding of the horizontal deflection transformer and a second winding connected to a second output winding of the vertical deflection transformer, said third transformer having an adjustable magnetic core.

W. J. OSTREICHER.

REFERENCES CITED

The following references are of record in the file of this patent:

UNITED STATES PATENTS

| Number | Name | Date |
|---|---|---|
| 1,995,376 | Campbell | Mar. 26, 1935 |
| 2,098,390 | Iams | Nov. 9, 1937 |
| 2,215,285 | Ballard | Sept. 17, 1940 |
| 2,220,303 | Tingley | Nov. 5, 1940 |
| 2,261,309 | Stuart, Jr. | Nov. 4, 1941 |
| 2,395,966 | Goldberg | Mar. 5, 1946 |
| 2,438,359 | Clapp | Mar. 23, 1948 |
| 2,451,641 | Torsch | Oct. 19, 1948 |